United States Patent [19]

Morita

[11] 4,030,898

[45] June 21, 1977

[54] QUICK FREEZING APPARATUS

[76] Inventor: Masahiro Morita, 4-15, 3-chome, Nishigahara, Kita, Tokyo, Japan

[22] Filed: Nov. 19, 1975

[21] Appl. No.: 633,401

[30] Foreign Application Priority Data

Nov. 27, 1974 Japan .............................. 49-135551

[52] U.S. Cl. .................................... 62/345; 62/375
[51] Int. Cl.² ...................... A23G 9/00; F25D 17/02
[58] Field of Search .............. 62/63, 374, 375, 380, 62/64, 345; 220/4 E, 230, 319, 320, 64; 206/818; 134/125, 127, 130, 105

[56] References Cited

UNITED STATES PATENTS

| 1,822,718 | 9/1931 | Vacassovich | 62/375 X |
|---|---|---|---|
| 1,847,956 | 3/1932 | Giger | 62/380 X |
| 1,977,373 | 10/1934 | Birdseye | 62/341 |
| 2,289,037 | 7/1942 | Poglein | 220/4 E |
| 2,561,477 | 7/1951 | Magnuson | 62/341 |
| 2,582,789 | 1/1952 | Morrison | 62/375 |
| 3,393,086 | 7/1968 | Keating | 220/64 X |
| 3,484,015 | 12/1969 | Rowan | 220/4 E |
| 3,749,301 | 7/1973 | Peckar | 206/818 |

Primary Examiner—Ronald C. Capossela
Attorney, Agent, or Firm—Anthony J. Casella; Joseph A. Calvaruso

[57] ABSTRACT

A quick freezing apparatus wherein a tank is charged with such medium which is liquid at the normal temperature and in a wide low temperature range under the atmospheric pressure as ethyl alcohol so as to be able to circulate and a food to be frozen is contained in a side-sealed freezing pan or endless conveyer belt and is passed through the liquid medium.

In order to omit the side seals, the edge parts in the lengthwise direction of the endless conveyer belt are projected above the liquid level of the liquid medium in the tank.

Also, as required, it is possible to spray the freezing pans with the coolant in the form of a mist or liquid.

13 Claims, 13 Drawing Figures

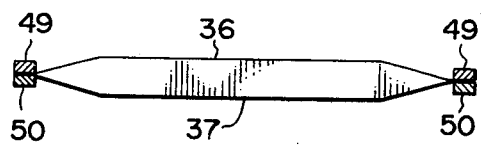
FIG. 9
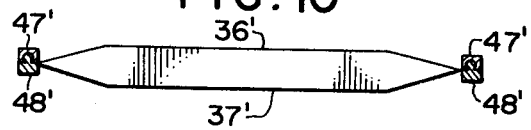
FIG. 10
FIG. 11
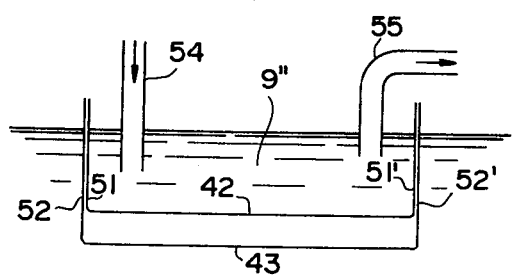
FIG. 12
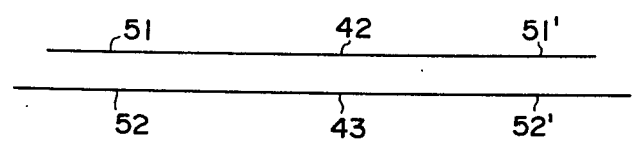
FIG. 13
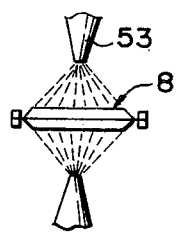

QUICK FREEZING APPARATUS

This invention relates to quick freezing apparatus.

In order to freeze a food to make a frozen food, a quick freezing apparatus is required from the taste and economy of the food.

There is a conventional quick freezing apparatus wherein liquid nitrogen or dry ice is used as a freezing energy source. There are also an air blast type, semi-air blast type and contact freezer type of such apparatus wherein freezing machines are used.

In the apparatus wherein liquid nitrogen or dry ice is used, the freezing effect is superior but the rate occupied by the price of the liquid nitrogen or dry ice itself in the freezing cost is high and the equipment can not help becoming large. Further, the gasified gas is agitated with agitating blades, a pre-cooling is made by a forced cooling and therefore the food used to be dried up.

In the apparatus wherein freezing machines are used, the running cost is low but, in the contact freezer type, as the food is compressed as held between freezing pans, the shape of the food is limited and, in the air blast type, the quick freezing effect is lower than of the above described type and, as the gas is low in the specific heat, air must be agitated so severaly that the product will be dried up and oxidized and the quality of the food will be reduced by the severe agitation. Thus there are merits and demerits.

An object of the present invention is to provide an effective quick freezing apparatus at a low cost by eliminating such defects as are mentioned above.

FIGS. 9 and 10 are sectioned views on line IX-X.

FIG. 11 is a sectioned elevation of an endless freezing belt having no side seal.

FIG. 12 is the same view as in FIG. 11 showing the endless freezing belt in FIG. 11 as fallen at both ends.

FIG. 13 is a schematic view showing an embodiment spraying a freezing pan with a freezing medium in the form of a mist or liquid.

EXAMPLE 1

Figure 1:
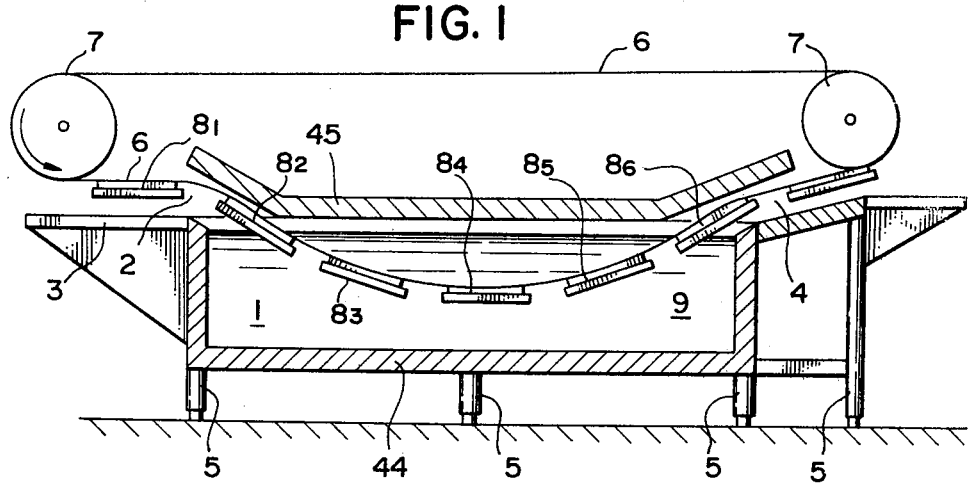
FIG. 1 is a schematic vertically sectioned side view of an embodiment of the present invention.

A heat-insulated low temperature freezing liquid tank 1 is filled with low temperature ethyl alcohol 9. Removable freezing pans $8_1$, $8_2$, $8_3$ . . . hung on a circulating conveyer 6 at a product inlet 3 enter the low temperature freezing liquid tank 1, have foods to be frozen in them frozen by such medium which is liquid at the normal temperature and in a wide low temperature range under the atmospheric pressure as ethyl alcohol, propylene glycol, R-114, R-21, ethyl chloride or methylene chloride and are removed from the conveyer through a product outlet 4.

Figure 2:
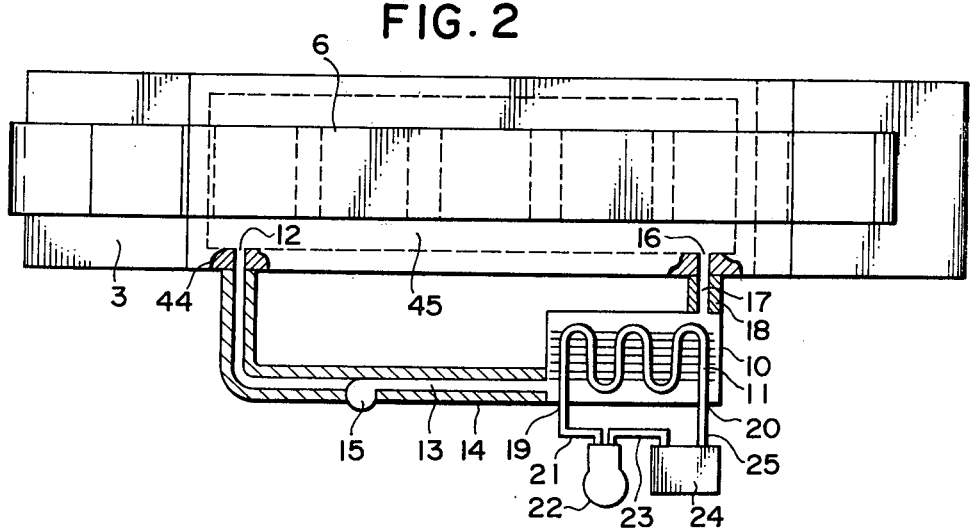
FIG. 2 is a plan formation view in FIG. 1.

The liquid medium 9 (which is ethyl alcohol in this embodiment) in the low temperature freezing liquid tank sucks in ethyl alcohol elevated in the temperature through a liquid sucking port 12 in the tank 1 by means of a liquid feeding pump 15 (FIG. 2), is fed into a heat exchanger 10, is cooled by a low temperature coolant in the heat exchanger, passes through a conduit pipe 17 and returns into the tank 1 through a delivery port 16. The coolant in the heat exchanger 10 is gasified by absorbing heat from the alcohol, is sucked in through a sucking port 19, is compressed by a compressor 22, is cooled and liquefied by a condenser 24 and returns to the heat exchanger 10 through a delivery port 20. 44 is an adiabatic material of the low temperature freezing liquid tank. 45 is an adiabatic cover of the low temperature freezing liquid tank. 5 is an adjusting leg for the height of the low temperature freezing liquid tank. The conveyer 6 is driven by a pair of driving pulleys 7. On the other hand, the liquid sucking port 12 and heat exchanger 10 are connected with each other through a conduit pipe 13 coated with an adiabatic material 14 and the delivery port 16 and heat exchanger 10 are connected with each other through a conduit pipe 17 coated with an adiabatic material 18. Conduit pipes 21, 23 and 20 are to respectively connect the heat exchanger pipe 11 with the compressor 22, the compressor 22 with the condenser 24 and the condenser 24 with the heat exchanger pipe.

Figure 3:
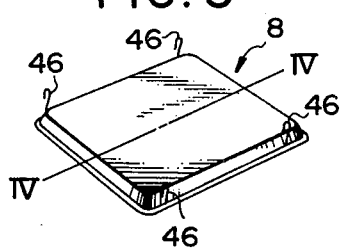
FIG. 3 is perspective view of a pan frozen by the present invention.
Figure 4:
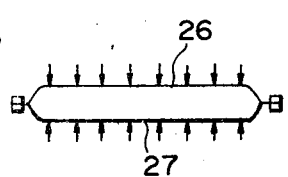
FIG. 4 is a sectioned view on line IV—IV in FIG. 3.
Figure 5:
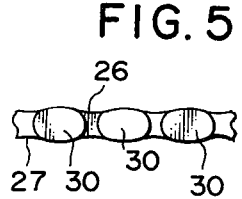
FIG. 5 is a sectioned view of a part of the freezing pan.

FIG. 3 is of an example of the freezing pan. Cooling surfaces 26 and 27 are made of a thin flexible material (such as, for example, a stainless steel sheet or stainless steel sheet laminated or coated with a plastic for example, Teflon) so as to be subjected to the liquid pressure of the low temperature freezing liquid as in FIG. 4 when put in the low temperature freezing liquid tank and to be in intimate contact with an article 30 to be frozen as in FIG. 5 with a high freezing effect. Hanging hooks 46 in FIG. 3 are provided to support the freezing pan on the conveyer 6.

Figure 6:
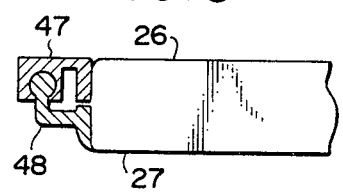
FIGS. 6 and 7 are magnified sectioned views of parts of the freezing pan.
Figure 7:
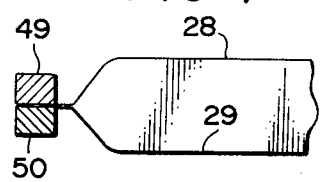

FIGS. 6 and 7 show examples of the side seal of the freezing pan. In FIG. 6, a member 47 having a concave is provided on the side surface of the cooling surface 26, a member 48 having a convex is provided on the side surface of the cooling surface 27 and a side seal is formed by fitting the concave and convex with each other. On the other hand, in FIG. 7, a side seal is formed by holding the upper part 28 and lower part 29 of the freezing pan with magnets 49 and 50.

Further, air is extracted from the hermetically sealed freezing pan containing the article to be frozen through a valve provided in a part of the flexible freezing pan so that the freezing pan may come into more intimate contact with the article to be frozen and therefore the article may be more effectively frozen.

Thus, according to the present invention, a frozen product can be quickly obtained while in contact by passing an article to be frozen through a low temperature liquid of such medium which easily comes to be at a superlow temperature while being liquid as it is as, for example, ethyl alcohol to use its characteristics (for example, the coagulating point of ethyl alcohol is 117° C.). Also the continuous operation is possible and therefore the efficiency is high. The coolant in the low temperature freezing liquid tank is preferably ethyl alcohol to be used to freeze the article to be frozen which has no toxicity to the frozen product. The ethyl alcohol may be a mixed liquid of ethyl alcohol and water or a mixed liquid of ethyl alcohol and water with the addition of calcium chloride or sodium chloride.

EXAMPLE 2

Figure 8:
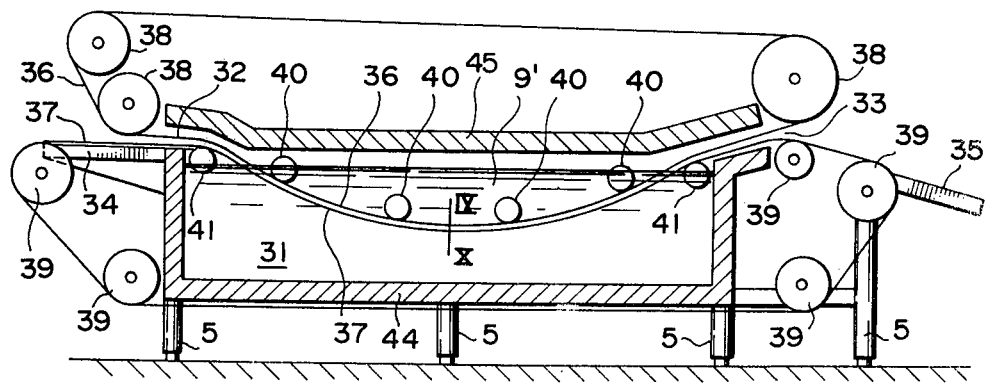
FIG. 8 is a schematic vertically sectioned side view of another embodiment of the present invention.

In the apparatus shown in FIG. 8, the low temperature freezing liquid tank and the heat exchanger to cool the liquid medium, compressor and condenser attached to it are the same as in Example 1 but an endless belt is used to convey articles to be frozen and articles are frozen by passing this belt through the low temperature freezing liquid tank 9' in FIG. 8. That is to say, this belt is made of substantially the same material as is used for the freezing pan in Example 1, has no seal in the advancing direction as shown in FIG. 8 but has seals only in the direction at right angles with it, that is to say, only in the lengthwise direction of the endleds belt as shown in FIGS. 9 and 10.

A lower belt 37 having articles to be frozen mounted on a product inlet base 34 is sealed on the sides with an upper belt 36 and enters a low temperature freezing liquid tank 31 through an inlet 32 and the articles to be frozen are frozen by being cooled from above and below by the low temperature freezing liquid 9' with which the tank 31 is filled. That is to say, the upper belt 36 and lower belt 37 form a freezing pan. This freezing pan is made of a thin flexible material and is subjected to the liquid pressure in the low temperature freezing liquid so as to be in contact with the article to be frozen and therefore the freezing efficiency is high. Further, this embodiment is continuous in freezing and is therefore adapted to freeze a larger quantity than in Example 1.

The products come in through the product inlet 32, come out through a product outlet 33 and drop down the chute 35. The upper belt 36 is driven by driving pulleys 38 and is guided by guide rollers 40 in the tank 31. On the other hand, the lower belt 37 is driven by driving pulleys 39 and is guided by guide rollers 41 in the tank 31.

By the way, in this embodiment, too, the tank 31 is supported by the adjusting legs 5 in the same manner as in the above mentioned embodiment. FIGS. 9 and 10 are of examples of the side seals for the upper and lower belt lines. In FIG. 9, the upper and lower belts are held on the side surfaces by magnets 49 and 50 in the same manner as in the embodiment in FIG. 7. On the other hand, in FIG. 10, a side seal is formed by fitting parts 47' and 48' having respectively such convex and concave of a flexible material as in FIG. 6.

FIG. 11 is of an example having no side seal.

As in FIG. 12, both edge parts 51, 51', 52, 52' in the lengthwise direction of an upper belt 42 and lower belt 43 are made flexible or are made of Teflon or the like so as to fall horizontally in passing on the pulleys (see FIG. 12) but to be erected upright to project above the level of the freezing liquid as in FIG. 11 in the low temperature freezing liquid so that the low temperature freezing liquid may come in through a liquid pouring port 54 while being prevented from entering the interior and the high temperature liquid may be delivered through a delivery port 55 to cool the surface of the freezing liquid 9''. The width of the upper belt 42 is preferably made narrower than the width of the lower belt 43 so that the respective outer ends may be flush with each other when both belts 42 and 43 are erected upright. In such case, no particular seal will be required. By the way, in case a buoyancy is produced between both belts 42 and 43, the liquid level inside may be elevated by the buoyancy.

EXAMPLE 3

A freezing pan containing an article to be frozen is sprayed with ethyl alcohol or the like kept at a low temperature in the form of a mist or liquid through nozzles 53 so that the article to be frozen in the freezing pan 8 may be frozen without being dipped in such liquid medium as ethyl alcohol in a low temperature freezing liquid tank.

Thus, in the present invention, a thin flexible freezing pan is passed through a low temperature freezing liquid so as to freeze an article to be frozen in contact, therefore the freezing effect is high, a low temperature energy is obtained by the freezer and therefore the economy is high.

What is claimed is:

1. An apparatus for quick freezing articles, comprising a tank charged with a freezing medium which is liquid at the normal temperature and in a low temperature range under atmospheric pressure; continuous conveying means for containing the articles to be frozen, said conveying means being made of a thin, flexible material having a high temperature conductivity; guiding means for guiding and dipping said conveying means into the medium in said tank, so that liquid pressure in said medium causes said conveying means to come in intimate contact with the article to be frozen contained therein, the temperature of said medium being immediately transmitted to said article; driving means for continuously moving said conveying means; and means for continuously circulating and cooling said medium at least above said conveying means.

2. A quick freezing apparatus according to claim 1 wherein said conveying means consists of freezing pans supported by a conveyor and each divided into an upper part and lower part which are sealed with sealing members.

3. A quick freezing apparatus according claim 2 wherein said sealing members are formed of a concave in the upper part and a convex in the lower so as to seal the parts by fitting said concave and convex with each other.

4. A quick freezing apparatus according to claim 2 wherein said sealing members are formed of magnets holding said upper part and lower part on the outer peripheral side surfaces.

5. A quick freezing apparatus according to claim 1 wherein said conveying means consists of two endless conveyor belts running substantially in parallel with each other at least in said tank and a means of preventing said medium from entering the space between the respective belts in said tank.

6. A quick freezing apparatus according to claim 5 wherein the edges of said conveyor belts project above the level of the freezing medium when said conveyor belts are in said tank.

7. A quick freezing apparatus according to claim 5 wherein said medium entery preventing means consists of side seals sealing the edge parts in the lengthwise direction of each belt.

8. A quick freezing apparatus according to claim 1 wherein the flexible material of said conveying means is a stainless steel sheet.

9. A quick freezing apparatus according to claim 1 wherein the flexible material of said conveying means is a stainless steel sheet laminated with a plastic.

10. A quick freezing apparatus according to claim 9 wherein said plastic is Teflon.

11. A quick freezing apparatus according to claim 1 wherein said liquid medium is a member selected from the group consisting of ethyl alcohol, R-114, R-21, ethyl chloride and ethylene chloride.

12. A quick freezing apparatus according to claim 1 wherein said means for circulating and cooling the medium consists of a delivery port and suction port opening in the tank and a heat exchanger for cooling said medium coming in through said suction port.

13. An apparatus for quick freezing articles comprising a tank charged with a freezing medium which is liquid at the normal temperature and in a low temperature range under atmospheric pressure; a continuous conveying means for containing the articles to be frozen, said conveying means including upper and lower endless conveyor belts running substantially parallel to each other, at least in said tank, said upper and lower conveyor belts, at least when in said tank, defining a space therebetween for containing the articles to be frozen, said conveyor belts being made from a thin, flexible material having a high temperature conductivity; guiding means for guiding and dipping said conveyor belts into the medium in said tank, such that liquid pressure in said freezing medium causes said conveyor belts to come in intimate contact with the article to be frozen, the temperature of said medium being immediately transmitted to said article; pulleys for driving said conveyor belts, said conveyor belts being substantially flat when passing over said pulleys, the edges of said conveyor belts projecting above the level of the freezing medium when the belts are in said tank, whereby the freezing medium is prevented from entering the space defined between said conveyor belts.

\* \* \* \* \*